US011179964B2

(12) United States Patent
Franco

(10) Patent No.: US 11,179,964 B2
(45) Date of Patent: Nov. 23, 2021

(54) MICRO-SUCTION REUSABLE AND REPOSITIONABLE WRITING SURFACES

(71) Applicant: COMSERO, INC., Denver, CO (US)

(72) Inventor: Anthony Franco, Broomfield, CO (US)

(73) Assignee: COMSERO, INC., Denver, CO (US)

(*) Notice: Subject to any disclaimer, the term of this patent is extended or adjusted under 35 U.S.C. 154(b) by 659 days.

(21) Appl. No.: 16/112,630

(22) Filed: Aug. 24, 2018

(65) Prior Publication Data
US 2019/0084341 A1 Mar. 21, 2019

Related U.S. Application Data

(60) Provisional application No. 62/561,568, filed on Sep. 21, 2017, provisional application No. 62/561,570, filed on Sep. 21, 2017, provisional application No. 62/561,581, filed on Sep. 21, 2017, provisional application No. 62/561,559, filed on Sep. 21, 2017, (Continued)

(51) Int. Cl.
| B43L 1/00 | (2006.01) |
| B43L 3/00 | (2006.01) |
| B43L 1/12 | (2006.01) |
| B32B 5/18 | (2006.01) |
| B32B 27/06 | (2006.01) |
| B32B 7/12 | (2006.01) |
| B32B 37/12 | (2006.01) |
| B32B 38/00 | (2006.01) |
| B32B 5/32 | (2006.01) |

(52) U.S. Cl.
CPC ............ B43L 1/00 (2013.01); B32B 5/18 (2013.01); B32B 7/12 (2013.01); B32B 27/065 (2013.01); B32B 37/12 (2013.01); B32B 38/004 (2013.01); B43L 1/126 (2013.01); B43L 3/004 (2013.01); B43L 3/008 (2013.01); B32B 5/32 (2013.01); B32B 2255/102 (2013.01)

(58) Field of Classification Search
CPC .. B43L 1/00; B43L 1/126; B43L 3/004; B43L 3/008; B32B 7/12; B32B 27/065; B32B 5/18
See application file for complete search history.

(56) References Cited

U.S. PATENT DOCUMENTS 3,110,917 A 11/1963 Mcpeek
3,529,799 A 9/1970 Schaefer
(Continued)

OTHER PUBLICATIONS

Office Action dated Nov. 30, 2018 in U.S. Appl. No. 16/138,487.

Primary Examiner — Hai Vo
(74) Attorney, Agent, or Firm — Dorsey & Whitney LLP

(57) ABSTRACT

Disclosed is a writing board attached to a surface for receiving notes or instructions from a user. The writing board includes vinyl foam, a flexible coating, and an adhesive layer. The writing board further includes a second temporary backing film. The vinyl foam includes a top surface and a microscopic cavernous surface. The flexible coating is coated on one of the microscopic cavernous surface to render the vinyl foam air-tight. The temporary backing film covers the microscopic cavernous surface coated with the flexible coating. A user peels off the temporary backing film to firmly attach the vinyl foam to the surface. The erase film is attached to the top surface of the vinyl foam. The erase film allows the user to write and erase content. The adhesive layer attaches the erase film to the top surface of the vinyl foam.

11 Claims, 4 Drawing Sheets

Related U.S. Application Data provisional application No. 62/561,550, filed on Sep. 21, 2017.

(56) References Cited

U.S. PATENT DOCUMENTS

| | | |
|---|---|---|
| 3,861,639 A | 1/1975 | Morrill |
| 4,100,684 A | 7/1978 | Berger |
| 4,207,646 A | 6/1980 | Osborne |
| 4,262,874 A | 4/1981 | Seigh |
| 4,315,615 A | 2/1982 | Scocozza |
| 4,415,092 A | 11/1983 | Boyer |
| 4,437,639 A | 3/1984 | Stein |
| 4,875,591 A | 10/1989 | Mikesell |
| 5,072,483 A | 12/1991 | Durand |
| D333,085 S | 2/1993 | Thomsen |
| 5,249,765 A | 10/1993 | Garcia |
| 5,269,083 A | 12/1993 | Vampatella et al. |
| 5,425,524 A | 6/1995 | Messina |
| 5,432,973 A | 7/1995 | Wagner et al. |
| 5,605,313 A | 2/1997 | Erickson et al. |
| 5,775,919 A | 7/1998 | Gardner |
| 5,836,038 A | 11/1998 | Thorp |
| 5,947,304 A | 9/1999 | Thorp |
| 6,007,891 A | 12/1999 | Davis et al. |
| 6,056,468 A | 5/2000 | Niewiadomski |
| 6,186,461 B1 | 2/2001 | Pelaez |
| 6,719,260 B1 | 4/2004 | Hart |
| 6,793,430 B1 | 9/2004 | Liu |
| 6,945,414 B1 | 9/2005 | Stevens et al. |
| 7,309,181 B2 | 12/2007 | Hawkins |
| 7,891,124 B1 | 2/2011 | Willis |
| 7,967,520 B2 | 6/2011 | Hawkins |
| 8,032,966 B1 | 10/2011 | Keller |
| 8,141,838 B2 | 3/2012 | Johnson et al. |
| D663,776 S | 7/2012 | Lira-Nunez et al. |
| D669,937 S | 10/2012 | Lira-Nunez et al. |
| 8,544,805 B2 | 10/2013 | Virgin |
| 8,641,001 B2 | 2/2014 | Heffernon |
| 8,757,568 B2 | 6/2014 | Ko |
| 9,395,044 B2 | 7/2016 | Cheng |
| 9,409,437 B2 | 8/2016 | Green et al. |
| 9,486,082 B2 | 11/2016 | Warncke et al. |
| 9,974,399 B1 | 5/2018 | Tanger et al. |
| 10,349,759 B2 | 7/2019 | Wiggins |
| 2002/0160352 A1* | 10/2002 | Beno ............... B43L 1/00 434/408 |
| 2006/0003307 A1* | 1/2006 | Hester ............. B43L 1/10 434/408 |
| 2006/0186304 A1 | 8/2006 | Mcgee |
| 2007/0186384 A1 | 8/2007 | Broehl et al. |
| 2008/0120922 A1 | 5/2008 | Sullivan et al. |
| 2008/0166173 A1 | 7/2008 | Gibbons |
| 2009/0193629 A1 | 8/2009 | Suenaga |
| 2009/0250575 A1 | 10/2009 | Fullerton et al. |
| 2010/0068422 A1 | 3/2010 | Keyes |
| 2011/0159225 A1* | 6/2011 | Boyle ............. C09J 143/04 428/41.8 |
| 2012/0112022 A1 | 5/2012 | Cheng |
| 2013/0074299 A1 | 3/2013 | Rojdev |
| 2014/0265765 A1 | 9/2014 | Khodapanah et al. |
| 2014/0377736 A1 | 12/2014 | Essen et al. |
| 2016/0073796 A1 | 3/2016 | Nesbitt |
| 2018/0125269 A1 | 5/2018 | Smeja |
| 2018/0134067 A1* | 5/2018 | Jennings ......... B43L 1/00 |

* cited by examiner

MICRO-SUCTION REUSABLE AND REPOSITIONABLE WRITING SURFACES

CROSS-REFERENCES TO RELATED APPLICATIONS

This application claims the benefit of U.S. Provisional Patent Application Nos. 62/561,550, 62/561,559, 62/561,570, 62/561,581 and 62/561,568 all filed Sep. 21, 2017, incorporated herein by reference in their entirety.

FIELD OF THE INVENTION

The present invention generally relates to flexible marking surfaces and more particularly related to reusable and repositionable writing surfaces featuring micro-suction characteristics.

BACKGROUND OF THE INVENTION

Despite the popularity of digital communications and word processing, the traditional tools of paper and writing instruments remain preferable in many circumstances. The ubiquitous paper sticky note has been in popular use for years. For example, 3M "post-it" brand paper sticky notes and similar concepts (referred to herein as "post-it notes") allow people to quickly take notes and stick the notes to various things, such as physical desks, physical folders, equipment, walls, and the like.

When thoughts run through an individual's head it is sometimes useful to jot them down so as not to forget them. For example, at home, or at work, an individual may remember tasks that he has to complete, groceries he needs to purchase, or information that needs to be remembered, and he will scribble notes on a napkin or sheet of paper and stuff it in a pocket. Such processes are also useful during team brainstorm sessions, wherein a multitude of people engage team ideation in real time.

Post-it notes are generally used to remind the creator of the note of specific work tasks. Pocket notes and loose sheets of paper, in contrast are easily misplaced, and seldom available when later needed. However, a problem remaining with such pocket notes, loose sheets of paper, and post-it notes is that they are not reusable. For instance, 50 billion post-it notes are thrown into landfills every year. This waste corresponds to 250,000 trees cut annually. A factor contributing to the reckless disposal of post-it notes is that once post-it notes lose their ability to stick, much of their usefulness is lost.

Notes often accompany daily tasks. In many contexts, it would be helpful to write to down the measurements, but a sheet of paper and a pen may not be readily available for a user. Moreover, in a variety of contexts, notes lacking adhesive backing are then pasted using tapes or adhesives. A problem encountered during such ad-hoc usage is that there is not enough side surface area of such tapes to grab and peel, leaving people frustrated when trying to move thin, fully-sticking notes around a wall.

Some configurations of post-it notes contain adhesive with temporarily reusable adhesive properties. However, if the adhesive is too strong, for instance, the material becomes too difficult to remove. If the adhesive is too weak, the material will not remain adhered to the surface. Residue left following placement and removal also remains a problem. Additionally, even reusable adhesives have a limited lifespan. For example, once an adhesive surface as typically known in the prior art gets a little dust on it, the adhesive stops sticking as intended.

It would be greatly advantageous to provide an alternative to paper notes, therefore, by offering a writing surface that is reusable and repositionable. A need remains for the writing surface to adhere to a surface without leaving a residue. Furthermore, a need remains for a note capture mechanism to reusably stick to a variety of surfaces.

SUMMARY OF THE INVENTION

In accordance with teachings of the present invention, a micro-suction reusable and repositionable writing surfaces is provided.

An object of the present invention is to provide a writing board attached to a surface. The writing board includes a closed-cell vinyl foam, a water-tight and/or air-tight flexible coating, a temporary backing film, an erase film, and an adhesive layer. The writing board further includes a second temporary backing film.

The vinyl foam includes a top surface and a microscopic caverns surface on the opposite side. The flexible coating is placed on the microscopic cavernous surface to render the vinyl foam air-tight. The temporary backing film covers the microscopic cavernous surface coated with the flexible coating. A user peels of the temporary backing film to firmly attach the vinyl foam to the surface.

The erase film is attached to the uncoated area of the vinyl foam. The erase film allows the user to write and erase content. In various embodiments, the erase film could be characterized as a "dry-erase" or "wet-erase" film as readily understood by those skilled in the art. The adhesive layer attaches the erase film to the top surface of the vinyl foam. The writing board may be attached to any surface such as metal, wood, walls etc.

Another object of the present invention is to provide the writing board with a second temporary backing film to laminate the adhesive layer. Further, the length and width of vinyl foam matches with the erase film.

Another object of the present invention is to provide the writing board wherein the width and length of the vinyl foam is 56" and 150" respectively. Further, the combine size of the vinyl foam and the erase film is between 5" to 45".

Another object of the present invention is to provide a method for creating a writing board that includes the steps of coating the rear end of a vinyl foam with a flexible coating to create air-tight microscopic caverns, laminating the rear end of the vinyl foam with a temporary backing film, coating the top end of the vinyl foam with an adhesive, pasting an erase film on the adhesive matching the size of the vinyl foam, cutting the vinyl foam and the erase film to a desired width, and peeling away the temporary backing film to attach the erase film to an object.

The foregoing and other advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF DRAWINGS

Figure 1:
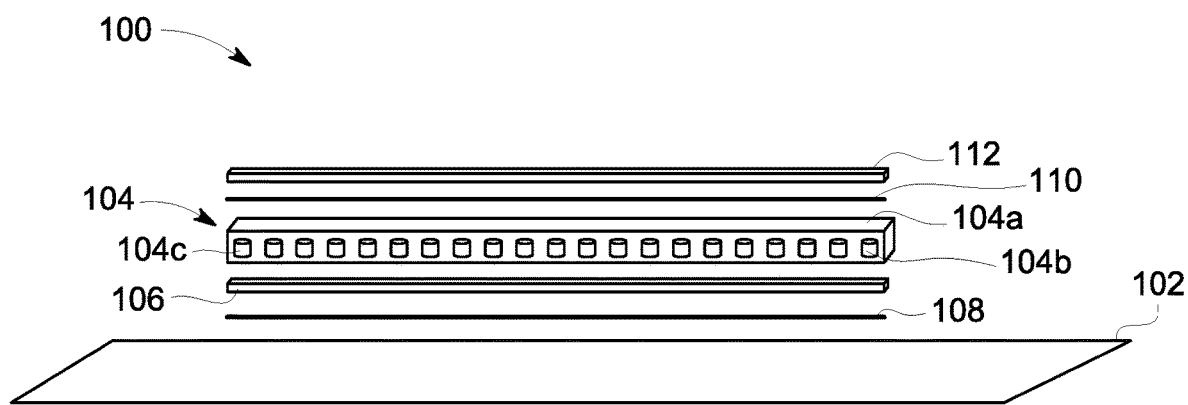
FIG. 1 illustrates a side exploded view of a writing board attached to a surface in accordance with a preferred embodiment of the present invention.

While this technology is illustrated and described in a preferred embodiment, a writing board may be produced in many different configurations, forms, shapes, color and sizes. This is depicted in the drawings and will be described in detail, as a preferred embodiment of the invention, with the understanding that the present disclosure is to be considered as an exemplification of the principles of the invention and the associated functional specifications for its construction. It is not intended to limit the invention to the embodiment illustrated. Those skilled in the art will envision many other possible variations within the scope of the technology described herein.

FIG. 1 illustrates a side exploded view of a writing board 100 attached to a surface 102 in accordance with a preferred embodiment of the present invention. The writing board 100 includes a vinyl foam 104, a flexible coating 106, a temporary backing film 108, an erase film 112, and an adhesive layer 110. Examples of the surface 102 include but are not limited to wooden, metal, walls etc.

The vinyl foam 104 includes: a top surface 104a and a microscopic cavernous surface 104b, 104c. In an embodiment, the microscopic caverns are only included on one side of the vinyl foam. In an embodiment, the microscopic cavernous surface 104b, 104c is intended to be coated with a flexible coating 106. In a preferred embodiment of the present invention, the description of the vinyl foam 104 is closed cell, black, glossy and polyvinyl chloride. Further the foam density is approximately 9.0 lbs/ft$^3$, foam tensile strength is 50 psi and foam elongation is 250%.

It would be readily apparent to those skilled in the art that various other foam description, foam density, foam tensile strength and foam elongation may be envisioned without deviating from the scope of the present invention. Examples of the vinyl foam 104 include but not limited to acrylic or PVC foam with microscopic crevasses.

The flexible coating 106 is coated on the microscopic cavernous surface 104b, 104c to render the vinyl foam 104 air-tight. Examples of the flexible coating 106 include but not limited to liquified rubber sealants, rubberized sealants, silicone sealants, and polysiloxane coatings etc.

The temporary backing film 108 covers the microscopic cavernous surface 104b, 104c coated with the flexible coating 106. A user peels off the temporary backing film 108 to firmly attach the vinyl foam 104 to the surface 102. Examples of the temporary backing film 108 include but are not limited to wax-coated paper, silicone coated paper, super, calendered kraft paper, glassine, clay coated kraft paper, machine finished kraft paper, machine glazed paper. The temporary backing film 108 and the microscopic end vinyl foam 104 is shown and explained in detail in conjunction with FIG. 3 of the present invention.

The erase film 112 is attached to the top surface 104a of the vinyl foam 104. The erase film 112 allows the user to write and erase content. Examples of the erase film 112 include but are not limited to PET or polyethylene, or any other similar dry erase film, wet erase, etc. The erase film 112 is shown and explained in detail in conjunction with FIG. 2 of the present invention.

The adhesive layer 110 attaches the erase film 112 to the top surface of 104a of the vinyl foam 104. Examples of the adhesive layer 110 include but are not limited to solvent-synthetic resins, cyanoacrylates, acrylics, anarobics, silicones, or urethanes.

Figure 2:
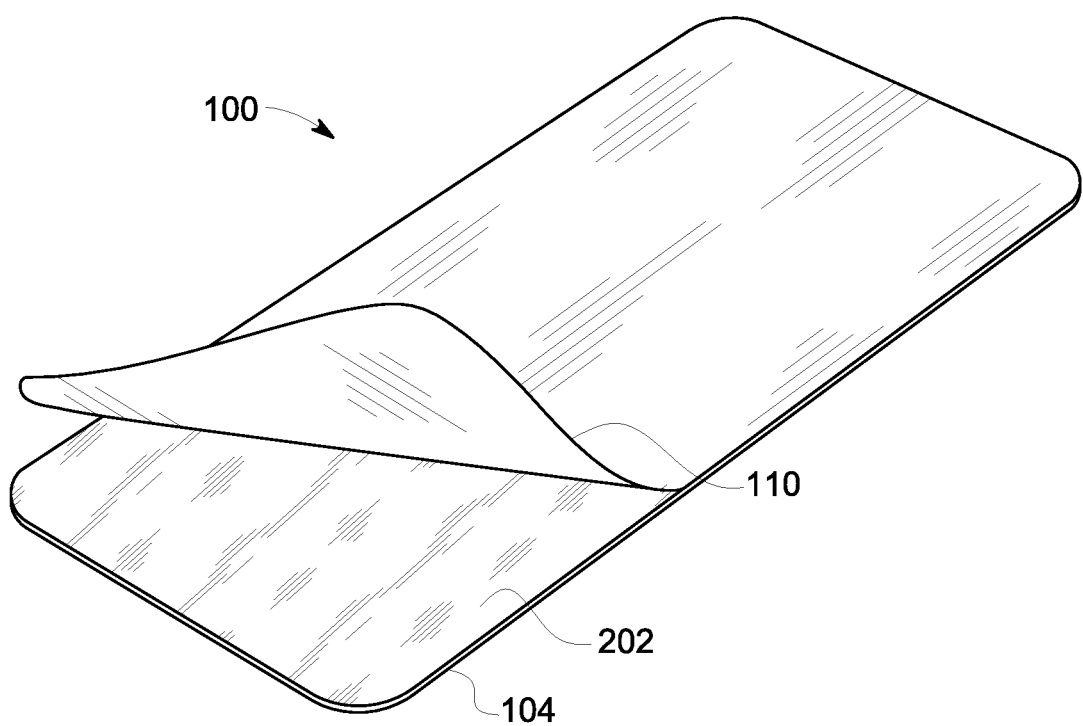
FIG. 2 illustrates a front perspective view of the writing board in accordance with a preferred embodiment of the present invention.

FIG. 2 illustrates a front perspective view of the writing board 100 in accordance with a preferred embodiment of the present invention. The erase film 110 allows the user to write or erase content such as notes or instructions. The notes or instructions may be either images or text. The length and width of the erase film 110 matches with the length and width of the vinyl foam 104. The combined size of the vinyl foam 104 and erase film 110 ranges between 5" and 45" in length.

In another preferred embodiment of the present invention, the writing board 100 further includes a secondary temporary backing film 202 to laminate the adhesive layer. Examples of the temporary backing film (108, shown in FIG. 1 and FIG. 3) and the second temporary backing film 202 include but not limited to wax-coated paper, silicone coated paper, super, calendered kraft paper, glassine, clay coated kraft paper, machine finished kraft paper, machine glazed paper.

Figure 3:
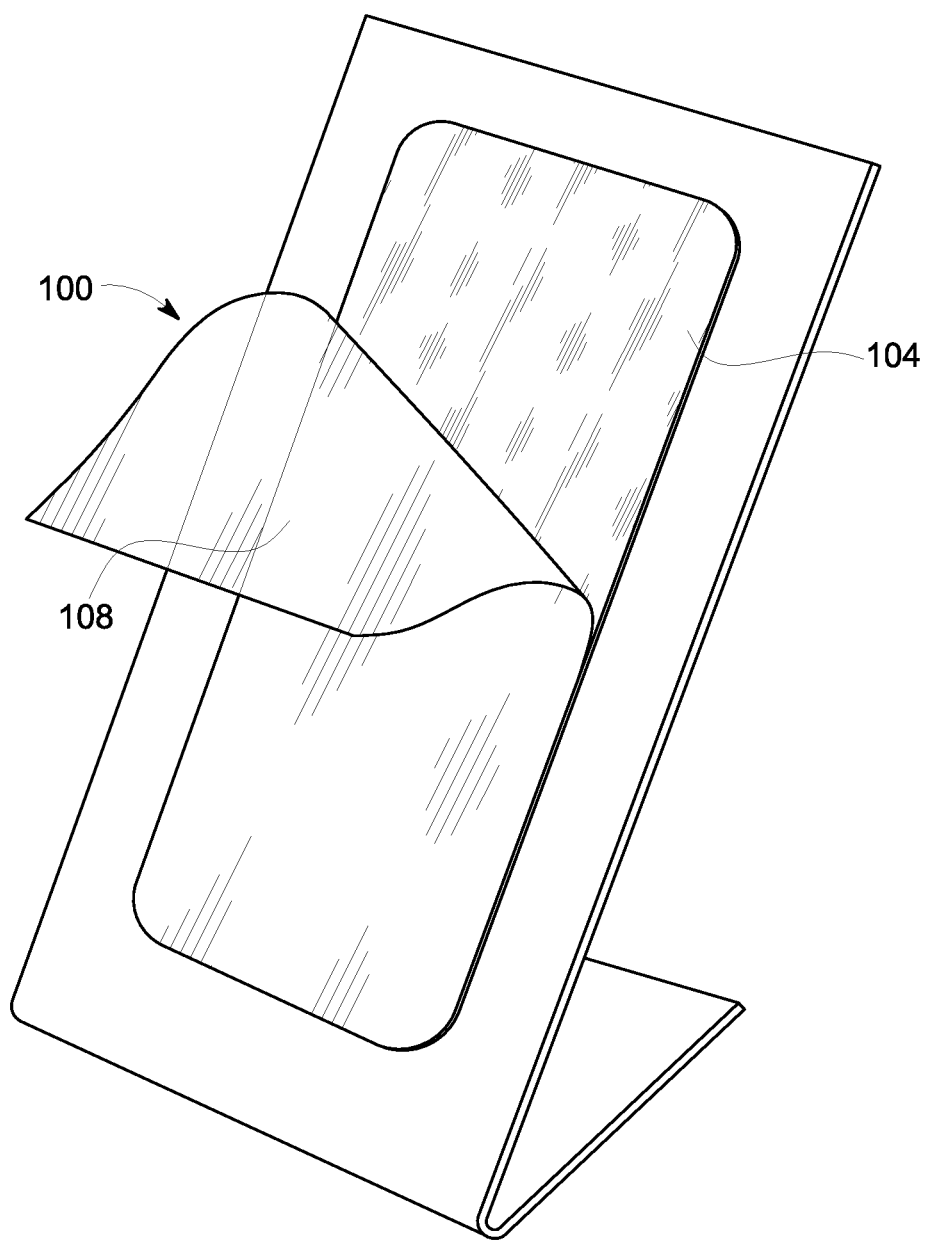
FIG. 3 illustrates a side perspective view of the writing board in accordance with a preferred embodiment of the present invention.

FIG. 3 illustrates a side perspective view of the writing board 100 in accordance with a preferred embodiment of the present invention. The temporary backing film 108 is peeled off by the user to attach the vinyl foam 104 to a surface 102. The microscopic caverns contain tiny pockets with a specialty formulated laminated skin that creates suction for coupling the vinyl foam 104 to a surface 102.

In an exemplary embodiment of the present invention, the width and the length of the writing board 100 is 56" and 150" respectively. It would be readily apparent to those skilled in the art that various shapes and sizes of the writing board 100 may be envisioned without deviating from the scope of the present invention.

The thickness of the writing board 100 in some embodiments must be at least 0.05" to allow for usability, die cut and creation of custom shapes. Examples of the shapes of the writing board 100 include but are not limited to arrows, human figures for anatomy, custom cut to fit a specific wall space, geometrical shapes etc.

Figure 4:
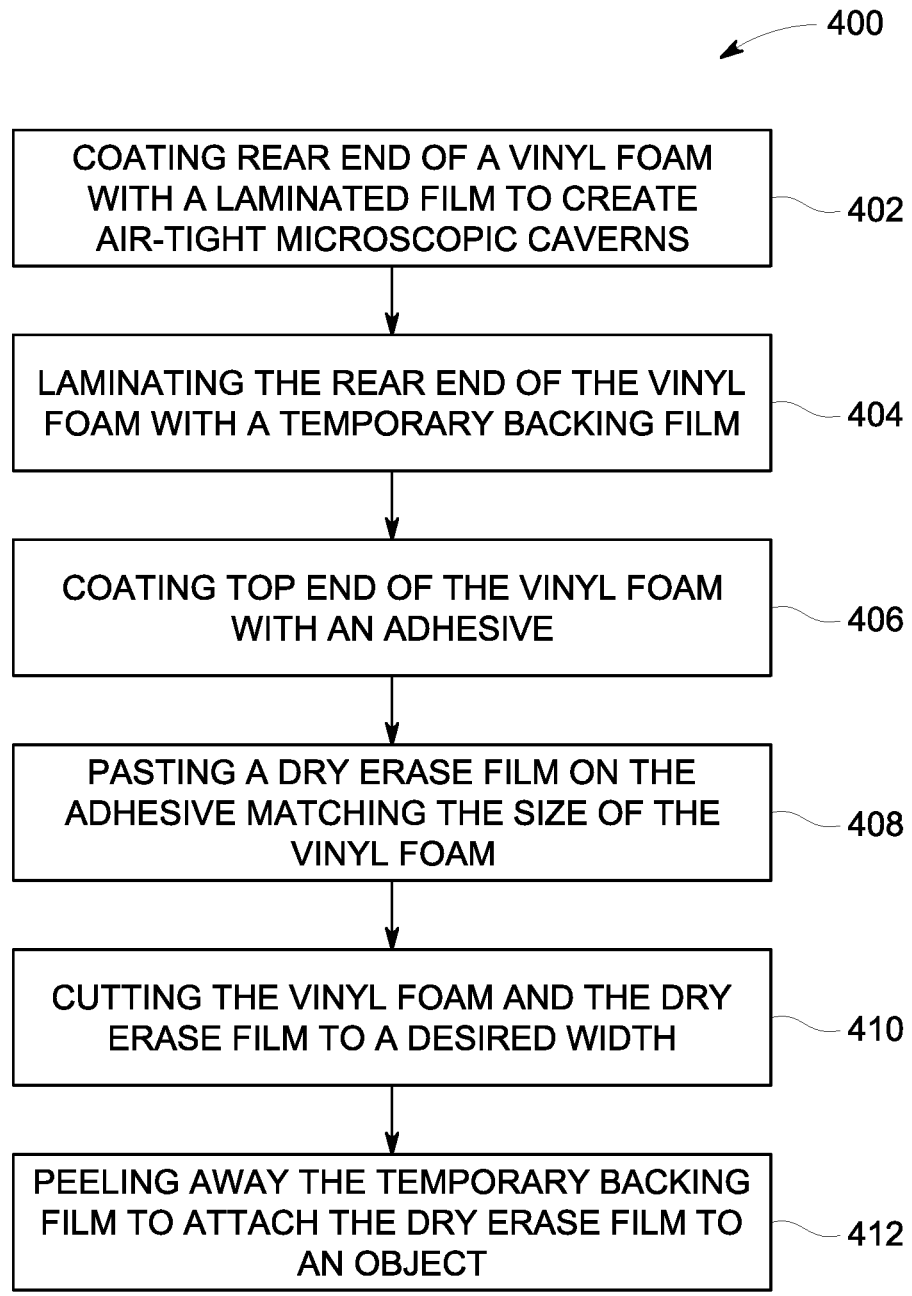
FIG. 4 illustrates a flowchart for a method for creating a writing board in accordance with another preferred embodiment of the present invention.

FIG. 4 illustrates a flowchart for a method 400 for creating a writing board in accordance with another preferred embodiment of the present invention. The method 400 initiates with a step 402 of coating rear end of a vinyl foam with a flexible coating to create air-tight microscopic caverns. The step 402 is followed by a step 404 of laminating the rear end of the vinyl foam with a temporary backing film.

The step 404 is followed by a step 406 of coating top end of the vinyl foam with an adhesive. The step 406 is followed by a step 408 of pasting a erase film on the adhesive matching the size of the vinyl foam. The adhesive should be suitable to use with the erase film.

The step 408 is followed by a step 410 of cutting the vinyl foam and the erase film to a desired width. In an exemplary embodiment of the present invention, the desired width is 5.25", 11", 22" and 44". The step 410 is followed by a step 412 of peeling away the temporary backing film to attach the vinyl foam to an object.

The vinyl foam, the flexible coating, the temporary backing film, the adhesive and the erase film are explained in detail in conjunction with FIG. 1 to FIG. 3 of the present invention. In another preferred embodiment of the present invention, the method 400 further includes a step of laminating the adhesive between the erase film and the vinyl foam with another temporary backing film.

The writing board is cut into a desired length. The writing board is then die-cut into the desired shape. The shape of the writing board is generally a square or rectangular in ratio of 4:3, 16:9 and 2:1. Finally, the writing board is a clean-edged sticker with at least 1 mm thickness and exhibits a balanced mix of rigidity and flexibility similar to that of a 2 mm thickness.

The present invention offers various advantages such as durability of the writing board to be reused multiple times. The present invention further provides the writing board with zero-adhesive attaching to a surface. The zero-adhesive results in providing excellent sticking power even when the material is washed with water. The present invention provides a portable writing board to be attached to any surface and to be used for longer time.

Many changes, modifications, variations and other uses and, applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. A writing board attached to a surface, the writing board comprising:
    a vinyl closed cell foam having a top surface and a microscopic cavernous bottom surface;
        a non-adhesive flexible elastomeric polymer coating coated on the microscopic cavernous bottom surface to render the vinyl closed cell foam air-tight;
    a temporary backing film to cover the microscopic cavernous surface coated with flexible elastomeric polymer sealant;
    an erase film attached to the top surface of the vinyl closed cell foam, the erase film allows a user to write and erase content; and
    an adhesive layer to attach the erase film to the top surface of the vinyl closed cell foam;
        wherein the user peels of the temporary backing film to firmly attach the vinyl closed cell foam to the surface, and wherein the non-adhesive flexible elastomeric polymer coating removably and reusably couples the writing board to the surface.

2. The writing board according to claim 1 wherein the length and width of the vinyl closed cell foam matches with the erase film.

3. The writing board according to claim 1 wherein the vinyl foam is 56" in width and 150" in length.

4. The writing board according to claim 1 wherein a combined thickness of the vinyl closed cell foam and the erase film is between 5" to 45".

5. A re-useable writing surface that removably couples to an exterior surface, the writing surface comprising:
    a closed cell foam having a top surface and a bottom porous surface;
    a non-adhesive flexible elastomeric polymer coating applied to the bottom porous surface to seal the closed cell foam watertight, defining a coated porous surface;
    a writable layer attached to the top surface of the closed cell foam, the writable layer defining a dry or a wet erase surface; and
    an adhesive layer positioned between the writable layer and the top surface of the closed cell foam that attaches the writable layer to the top surface of the closed cell foam;
    wherein the non-adhesive flexible elastomeric polymer coating removably and reusably couples the writing surface to the exterior surface.

6. The writing surface of claim 5, wherein the non-adhesive flexible elastomeric polymer coating directly attaches to the exterior surface.

7. The writing surface of claim 5, wherein the writable layer and the closed cell foam layer are coextensive.

8. The writing surface of claim 5, wherein the writable layer is made from a plastic material.

9. A flexible re-useable writing surface comprising:
    a backing layer having a first side and a second side opposite the first side, the backing layer comprising:
        a closed cell foam having a top surface and a bottom surface and defining a plurality of cells therein; and
        a non-adhesive flexible elastomeric polymer coating applied to the bottom surface to close a subset of the plurality of cells exposed on the bottom surface of the closed cell foam; and
    an erasable writable layer attached to the first side of the backing layer; wherein the second side of the backing layer removably couples to one or more surfaces, thereby attaching the erasable writing layer to the one or more surfaces, and wherein the second side of the backing layer is defined by the non-adhesive flexible elastomeric polymer coating and is watertight, and wherein the non-adhesive flexible elastomeric polymer coating removably and reusably couples the flexible re-useable writing surface to the one or more surface.

10. The flexible re-useable writing surface of claim 9, wherein the backing layer attaches directly to the one or more surfaces.

11. The flexible re-useable writing surface of claim 9, wherein the erasable writing layer is a dry or wet erase surface.

* * * * *